3,578,662
ISOCYANURATE MANUFACTURE
John H. Cornell, Jr., Arlington, Mass., assignor to Monsanto Research Corporation, St. Louis, Mo.
No Drawing. Continuation-in-part of application Ser. No. 165,249, Jan. 9, 1962. This application Oct. 10, 1967, Ser. No. 675,011
Int. Cl. C07d 55/38
U.S. Cl. 260—248  9 Claims

ABSTRACT OF THE DISCLOSURE

A process for producing trimers of isocyanates which involves contacting a monoisocyanate mixture thereof with a catalyst system comprising a basic compound and a hydrocarbon carbonylic compound of from 1–12 carbon atoms. These trimers are useful for the manufacture of resins, adhesives, impregnants, and cast or molded materials.

---

This application is a continuation-in-part of copending U.S. patent application Ser. No. 165,249 filed Jan. 9, 1962, now abandoned.

BACKGROUND OF THE INVENTION

Part 1.—The field of the invention

This invention relates to polyisocyanurates and more particularly to a new and improved process for producing trimers of isocyanates.

Part 2.—Description of the prior art

It is known in the art that organic isocyanates are converted to the corresponding isocyanurates by trimerization in presence of a basic catalyst, thus:

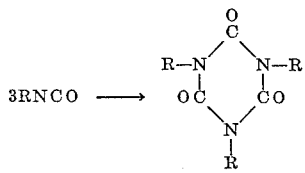

in which R is an organic radical.

Generally, however, rate of reaction is slow, and yields of the isocyanurate are poor owing to simultaneous formation of by-products, e.g., dimeric isocyanates and various other linear branched and unbranched materials. Such by-products not only lower the yield of the desired trimer but also, since they can be separated from the trimer only with difficulty, if at all, the high molecular weight polyisocyanurate resins which are subsequently obtained from the trimer product are undesirable owing to cross-linking which stems from the by-product impurity. While reaction rate is materially increased when operating at high temperatures, formation of by-product is also thereby accelerated; moreover, for practical application, it is desirable to effect the trimerization at ambient temperatures. Also, although the trimerization at ordinary temperature is known to be accelerated by using certain alkylene or aralkylene oxides as co-catalysts with the ionic catalysts, the problem of impurities has not been solved thereby. High molecular weight polyisocyanurates manufactured from trimers that have been prepared in presence of ionic catalysts and said oxides still demonstrate disadvantages which arise from cross-linking and branching.

SUMMARY OF THE INVENTION

In accordance with the practice of my invention, I have discovered that monoisocyanates can be converted to trimers at an accelerated reaction rate by conducting the trimerization in the presence of a catalyst system comprising a basic compound and a hydrocarbon carbonylic compound of from 1–12 carbon atoms. An outstanding advantage in the practice of my invention is the high purity of the trimer obtained, that is to say, only minor amounts of by-products are obtained in comparison to prior art processes.

DESCRIPTION OF PREFERRED EMBODIMENTS

In the practice of my invention, the basic compound and the carbonylic compound need only be present in catalytic amounts, e.g., in respective amounts of say up to about 2.0 mole percent of the organic isocyanate. The ratio of basic compound to the carbonylic compound is preferably equimolar; however, any excess of the carbonylic compound may be employed so long as the basic compound is present in at least a catalytic quantity, for example, in an amount of at least about 0.1 mole percent based on the weight of the isocyanate, and the carbonylic compound is present in an amount which is not in excess of about 2.0 mole percent of the isocyanate. The amount of basic compound and carbonylic compound will vary, of course, depending upon the nature of the individual isocyanate and upon the temperature conditions employed. When operating at ambient temperature, for example, amounts of, say from about 0.3 to about 0.1 mole percent of basic compound and from 0.6 to 1.2 mole of carbonylic compound, based on the isocyanate, produce substantially complete trimerization. With certain catalyst systems, for example, formaldehyde or acrolein and 1,4-diazobicyclo [2.2.2]octane, phenyl isocyanate is converted to triphenyl isocyanurate almost instantaneously.

As hereinbefore stated, the present process has general applicability to conversion of organic isocyanates to the corresponding isocyanurates, i.e. by employing the present combination of compounds, alkyl isocyanates are converted to trialkylcyanurates, as are the aryl isocyanates or the nuclearly substituted aryl isocyanates converted to the correspondingly substituted isocyanurates. The trimers produced in accordance with the practice of the present invention are useful for the manufacture of resins, adhesives, impregnants, and cast or molded materials. For example, the present process can be employed in the trimerization of phenyl isocyanate or nuclear derivatives thereof such as the chlorophenyl, alkylphenyl and alkyloxyphenyl isocyanates having from 1 to 6 carbon atoms in the alkyl radical. Thus, according to the invention, there is readily obtained triphenyl isocyanurate from phenyl isocyanate; tris (2-, 3- or 4-chlorophenyl) isocyanurate from 2-, 3- or 4-chlorophenyl isocyanate; tris (2-, 3- or 4-bromophenyl) isocyanurate from 2-, 3- or 4-bromophenyl isocyanate, tris (2-, 3- or 4-tolyl) isocyanurate from 2-, 3- or 4-tolyl isocyanate; tris (4-butylphenyl) isocyanurate from 4-butylphenyl isocyanate, tris (3-hexylphenyl) isocyanurate from 3-hexylphenyl isocyanurate from 3-hexylphenyl isocyanate; tris (2-, 3- or 4-methoxyphenyl) isocyanurate from 2-, 3- or 4-methoxyphenyl isocyanate; tris (2-, 3- or 4-pentyloxyphenyl) isocyanurate from 2-, 3- or 4-pentyloxyphenyl) isocyanurate from 2-, 3- or 4-pentyloxyphenyl isocyanate, etc. The present process is particularly adaptable to trimerization of isocyanates of the formula

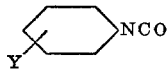

in which Y is selected from the class consisting of hydrogen, chlorine, bromine and alkyl and alkoxy radicals of from 1 to 6 carbon atoms.

Unsymmetrically substituted isocyanurates are obtainable from mixtures of two or more different isocyanates. Thus, from, say, mixtures of phenyl isocyanate and 4-ethoxyphenyl isocyanate, there are formed trimers of the structure

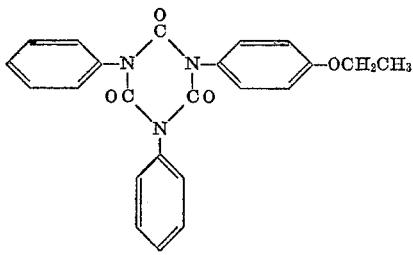

and

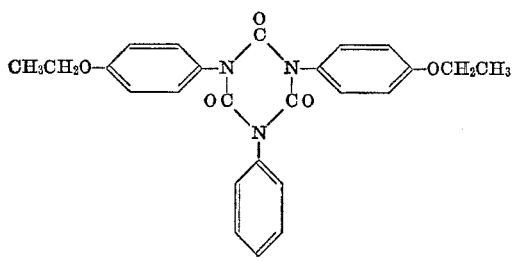

Depending upon the ratio of the phenyl isocyanate and of the 4-ethoxyphenyl isocyanate in the initial reaction mixture, the product may also contain the unsubstituted trimer, i.e., triphenyl isocyanurate and/or the trimer of the ethoxy compound, i.e., tris (4-ethoxyphenyl) isocyanurate.

Basic compounds, generally, are suitable for the present purpose, so long as they do not contain groups which are reactive with the isocyanate or the carbonylic compound under the reaction conditions. Examples of the presently useful basic compounds are organic amines such as triethylamine or N,N-dimethylaniline, heterocyclic nitrogen compounds such as pyridine, quinoline or N-methylmorpholine, and 1,4-diazobicyclo [2.2.2] octane, alkali metal or alkaline earth metal oxides and hydroxides and the basic reacting alkoxides, phenoxides or salts thereof such as sodium, potassium, lithium, rubidum, calcium, or magnesium oxide or hydroxide, sodium methoxide, potassium phenoxide, magnesium ethoxide, potassium stearate, lithium acetate, calcium naphthenate, sodium benzoate, rubidium propionate, sodium carbonate, sodium cyandie, etc. Organic amines and heterocyclic nitrogen compounds are especially preferred.

Useful carbonylic compounds are hydrocarbon carboxaldehydes or ketones, including quinones. They may be aliphatic, aromatic, aliphatic-aromatic, or alicyclic, and then may be saturated or unsaturated, and contain from 1 to 12 carbon atoms .Examples thereof are formaldehyde, acetaldehyde, butyraldehyde, undecaldehyde, acrolein, crotonaldehyde, propynal 2-dodecenal, cyclohexanecarboxaldehyde, 3,4-dimethyl-2-cyclopentene-carboxaldehyde, benzaldehyde, α- or β-naphthaldehyde, cinnamaldehyde, 2- or 4-tolualdehyde, acetone, 2-butanone, 4-heptanone, 5-dodecanone, propiophenone, acrylophenone, 5-hexene-2-one, cyclopentadienyl methyl ketone, 2-cyclohexenone, cyclopentanone, benzoquinone, etc. Although, as above stated, the carbonylic compounds generally are promoters for the base-catalyzed trimerization of the organic isocyanates, the lower aliphatic hydrocarboncarboxaldehydes are more active and are the preferred carbonylic compounds for the present purpose. Aromatic aldehydes are less active; ketones generally are less active than either formaldehyde or the paraffinic and olefinic hydrocarbon carboxaldehyde of from 2 to 4 carbon atoms, e.g., acetaldehyde, propionaldehyde, butyraldehyde, isobutyraldehyde, acrolein, crotonaldehyde or the butenals.

The trimerization may be carried out in the presence or absence of an inert organic liquid solvent or diluent. Preferably, for this purpose there is used a material in which the isocyanate is soluble and in which the product isocyanurate is insoluble. However, when the isocyanurate is intended to be used in applications wherein solutions thereof are useful, or when subsequent conversion to the less soluble or substantially insoluble high molecular weight, resinous polymeric isocyanurates is contemplated, solubility of the trimer is not a parameter in choice of solvent for the trimerization. The solvent or diluent can be, e.g., a hydrocarbon, a halogenated or nitrated hydrocarbon, an N,N'-dialkylcarboxamide, a dialkyl sulfoxide, or an aliphatic or heterocyclic ether, e.g., benzene, xylene, hexane, trichloroethylene, nitrogenzene, dimethylformamide, dimethyl sulfoxide, dipropyl ether, dioxane, etc.

The trimerization takes place at ambient or increased temperatures. Although, as pointed out above, the present process is particularly valuable in that ambient temperature, e.g., a temperature of from say 15° C. to 30° C., can be used to obtain excelent conversion of the isocyanate to the substantially pure isocyanurate, the process is operative at temperatures which can range upward to substantially the decomposition point of the reactant and/or diluent. The generally useful range of temperature is from, say, 5° C. to 125° C.

The invention is further illustrated by, but not limited to, the following examples:

EXAMPLE 1

To 5 ml. of phenyl isocyanate there was added at room temperature 5 drops of a saturated solution of 1,4-diazobicyclo [2.2.2] octane in dimethylformamide and then 5 drops of acrolein. There was instant, vigorous reaction, with complete conversation to triphenyl isocyanurate.

Upon repeating the experiment, but using 5 ml. of the isocyanate dissolved in 5 ml. of benzene, there was noted a short induction period followed by vigorous reaction and solidification to the triphenyl isocyanurate within about 12 minutes.

EXAMPLE 2

To a mixture consisting of 2 ml. of phenyl isocyanate and 2 ml. of 4-chlorophenyl isocyanate there was added at room temperature 5 drops of a saturated solution of 1,4-diazobicyclo [2.2.2] octane and then 5 drops of acrolein. Instant reaction with rapid solidification to trimer occurred.

In a subsequent experiment wherein the above reactants and catalyst system were used in the same quantities, but the reaction was conducted in 5 ml. of benzene, there occurred a short induction followed by gradual crystallization to the trimer.

EXAMPLE 3

Gaseous formaldehyde, generated by heating paraformaldehyde, was briefly bubbled into 5 ml. of phenyl isocyanate at room temperature to provide for about 3 drops of added formaldehyde. To the resulting mixture there was then added 5 drops of a saturated solution of 1,4-diazibicyclo [2.2.2] octane in dimethylformamide. Within about 15 minutes the whole was converted to the phenyl isocyanurate, M.P. 284–286° C.

EXAMPLE 4

To 5 ml. of phenyl isocyanate there was added at room temperature 5 ml. of a saturated soltuion of 1,4-diazobicyclo [2.2.2] octane in dimethylformamide and then 5 ml. of acetaldehyde. The resulting reaction mixture became warm, deposited crystals, and within two hours solidified completely to triphenyl isocyanurate.

EXAMPLE 5

To 5 ml. of phenyl isocyanate there was added 5 drops of a saturated solution of 1,4-diazobicyclo [2.2.] octane in dimethylformamide and then 5 drops of propionaldehyde. A heavy precipitate formed and observation next day, at the end of 15.5 hours, showed complete conversion to triphenyl isocyanurate, which upon recrystallization from ethanol had M.P. 287–288° C.

EXAMPLE 6

This example is like Example 5, except that 5 drops of benzaldehyde were used instead of propionaldehyde. Crystallization started within a few hours, and complete solidification to trimer by the end of several days. Recrystallization from ethanol gave the substantially pure phenyl isocyanurate, M.P. 287–288° C.

EXAMPLE 7

This example is like Example 5, except that acetone was used instead of propionaldehyde. Gradual conversion to triphenyl isocyanurate occurred.

EXAMPLE 8

To 5 ml. of phenyl isocyanate there was added 5 drops of a saturated solution of 1,4-diazobicyclo [2.2.2] octane in dimethylformamide and 5 drops of methyl vinyl ketone at room temperature. Crystals of triphenyl isocyanurate began to be deposited within an hour. The whole was then allowed to stand at room temperature for 2 days, at the end of which time complete conversion to triphenyl isocyanurate had occurred.

EXAMPLE 9

To 5 ml. of phenyl isocyanate there was added 5 ml. of a saturated solution of 1,4-diazobicyclo [2.2.2] octane in dimethylformamide and then 5 drops of dihydropyrone. Gradual crystallization with complete conversion to phenyl isocyanurate was observed.

EXAMPLE 10

A mixture consisting of 61 g. (0.51 mole) of phenyl isocyanate, 39 g. (.026 mole) of 4-chlorophenyl isocyanate and 100 ml. of benzene was prepared, and 7 cc. of the mixture was added to each one of 8 tubes. To each tube there was added 5 drops of a saturated solution of 1,4-diazobicyclo [2.2.2] octane in dimethylformamide as basic compound and 5 drops of one of the following carbonyl compounds:

(1) formaldehyde
(2) acrolein
(3) acetaldehyde
(4) benzaldehyde
(5) quinone
(6) cinnamaldehyde
(7) crotonaldehyde
(8) diacetyl The crystalline trimer which separated out was filtered off, washed and dried. Vapor phase chromatographic analysis showed that in each case there was present a mixture of the four possible isocyanurates, i.e., (A) triphenyl isocyanurate, (B) diphenyl 4-chlorophenyl isocyanurate, (C) phenyl bis(4-chlorophenyl) isocyanurate, and (D) tris(4-chlorophenyl) isocyanurate. As shown in the table below, the percentage of (A), (B), (C) or (D) varied with the carbonyl compound.

| | Wt. percent product composition | | | |
|---|---|---|---|---|
| | A | B | C | D |
| Carbonyl compound: | | | | |
| (1) | 31.6 | 36.1 | 24.6 | 7.5 |
| (2) | 17.6 | 47.6 | 29.7 | 5.7 |
| (3) | 23.0 | 43.6 | 27.3 | 4.9 |
| (4) | 15.9 | 41.5 | 25.5 | 6.7 |
| (5) | 5.6 | 33.0 | 42.5 | 18.9 |
| (6) | 15.2 | 47.3 | 38.6 | 11.1 |
| (7) | 13.1 | 35.7 | 35.8 | 15.3 |
| (8) | 18.1 | 42.0 | 32.6 | 7.2 |

The above data indicate that the content of unsubstituted trimer is a function of the accelerating efficiency of the carbonyl compound, since the use of (1) formaldehyde gave the most rapid reaction within a few minutes, and the highest ratio of unsubstituted trimer.

EXAMPLE 11

To each of four tubes there was added 7 cc. of the mixture of phenyl isocyanate, 4-chlorophenyl isocyanate and benzene described in Example 10. To each tube there was then added 5 drops of pyridine and 5 drops of either formaldehyde, acrolein, crotonaldehyde or quinone. As in Example 10, trimerization was most rapid with formaldehyde, although acrolein was almost as rapid in this instance. Vapor phase chromatographic analysis showed all four possible trimers to be present, the percent of the unsubstituted trimer being greatest for formaldehyde and lowest with quinone.

EXAMPLE 12

To a toluene solution of $2.0 \times 10^{-2}$ mole of phenyl isocyanate and $10^{-2}$ mole of 4-methoxyphenyl isocyanate there was added $0.3 \times 10^{-2}$ mole of 1,4 - diazobicyclo [2.2.2] octane and $0.3 \times 10^{-2}$ mole of acrolein at a temperature of 25° C. The quantity of toluene employed was calculated to give an approximately 40% concentration of the iscyanates plus catalysts. Gradual deposition of crystalline trimer occurred. At the end of 24 hours no aryl isocyanate odor was noted, which fact speaks for complete conversion of the isocyanates to the isocyanurates at that time.

The above experiment was repeated, except that instead of using acrolein, there was employed a sufficient quantity of a 1.5% solution of formaldehyde in dioxane to provide $0.3 \times 10^{-2}$ mole of formaldehyde. Here again, complete conversion of the isocyanates to isocyanurates was obtained within 24 hours.

Many incidental modifications of details of the above examples which are offered for the purposes of illustrating my invention can be made without departing from the spirit and scope of the invention.

Having described my invention as well as manners of practicing same together with preferred embodiments thereof, what I declare as new and desire to secure by U.S. Letters Patents is as follows:

1. In a process for trimerizing isocyanates which comprises contacting a monoisocyanate or mixture thereof with a catalytic amount of a basic catalyst which is unreactive to carbonylic compounds and isocyanates at reaction conditions, the improvement wherein there is present with said basic catalyst a catalytic amount of a hydrocarbon carbonylic compound consisting of an aldehyde or ketone having carbon, hydrogen and aldehyde or ketone oxygen and having from 1 to 12 carbon atoms.

2. The process of claim 1 wherein said basic catalyst is 1,4-diazobicyclo [2.2.2] octane.

3. The process of claim 1 wherein said basic catalyst is pyridine.

4. The process of claim 1 wherein said hydrocarbon carbonylic compound is formaldehyde.

5. The process of claim 1 wherein said hydrocarbon carbonylic compound is acrolein.

6. The process of claim 6 wherein said hydrocarbon carbonylic compound is acetaldehyde.

7. The process of claim 1 wherein said hydrocarbon carbonylic compound is propionaldehyde.

8. The process of claim 1 wherein said monoisocyanate is phenyl isocyanate.

9. The process of claim 1 wherein said monoisocyanate is a mixture of phenyl isocyanate and a haloisocyanate.

References Cited

UNITED STATES PATENTS

| | | | |
|---|---|---|---|
| 2,979,485 | 4/1961 | Burkus | 260—284X |
| 3,252,942 | 5/1966 | France et al. | 260—77.5 |
| 3,259,625 | 7/1966 | Ugi et al. | 260—248 |
| 3,144,452 | 8/1966 | Wild et al. | 260—248 |
| 3,179,626 | 4/1965 | Beitchman | 260—77.5 |

JOHN M. FORD, Primary Examiner

U.S. Cl. X.R.

260—77.5NC